(12) United States Patent
Toth et al.

(10) Patent No.: US 6,510,270 B1
(45) Date of Patent: Jan. 21, 2003

(54) SUB-OCEANIC CABLE NETWORK SYSTEM AND METHOD

(75) Inventors: John R. Toth, Clermont, FL (US); John P. Strauss, Ormond Beach, FL (US)

(73) Assignee: Ocean Design, Inc., Ormond Beach, FL (US)

( * ) Notice: Subject to any disclaimer, the term of this patent is extended or adjusted under 35 U.S.C. 154(b) by 7 days.

(21) Appl. No.: 09/912,702

(22) Filed: Jul. 24, 2001

(51) Int. Cl.[7] ................................................ G02B 6/10
(52) U.S. Cl. ................. 385/129; 174/101.5; 73/152.21; 181/118
(58) Field of Search ................................ 385/100, 129, 385/147; 73/32 R, 153, 861.62, 866.5, 152.21; 175/38, 24, 48, 216; 181/107, 118, 119, 120; 174/101.5, 705; 367/144

(56) References Cited

U.S. PATENT DOCUMENTS

| | | | |
|---|---|---|---|
| 4,535,851 A | * | 8/1985 | Kirkpatrick et al. ........ 175/218 |
| 4,599,712 A | * | 7/1986 | Chelminski ................. 181/118 |
| 4,703,664 A | * | 11/1987 | Kirkpatrick et al. ..... 73/152.21 |
| 4,757,482 A | * | 7/1988 | Fiske, Jr. ................. 174/101.5 |
| 5,738,535 A | | 4/1998 | Cairns |
| 6,017,227 A | | 1/2000 | Cairns et al. |

OTHER PUBLICATIONS

Perry Joseph Wright, "Optical Fiber's Gigabit Bandwidth, 200 km Range Attractive for Subsea Work", Offshore, May 2000.

Stewart Barlow, "Advances in Undersea Connector Technology Improve Efficiency", Lightwave Special Reports, Oct. 1999.

* cited by examiner

Primary Examiner—Akm E. Ullah
(74) Attorney, Agent, or Firm—Brown, Martin, Haller & McClain LLP

(57) ABSTRACT

A cable system for installation on the ocean floor or under another body of water includes a plurality of sub-sea junction boxes installed at spaced locations throughout a predetermined sub-oceanic cable network. At least some of the junction boxes are located at a predetermined distance off-shore from a respective on-shore cable junction node. A single main, high fiber count conduit extends from each off-shore junction box to the respective on-shore cable junction node. Each off-shore junction box has plurality of ports for releasable connection to a selected offshore cable terminated at the junction box, and a fiber routing unit in the junction box connects at least some of the ports to fibers in the main conduit.

21 Claims, 2 Drawing Sheets

SUB-OCEANIC CABLE NETWORK SYSTEM AND METHOD

BACKGROUND OF THE INVENTION

The present invention relates generally to a sub-oceanic or underwater cable network system and method, and is particularly concerned with a method and apparatus for improved initial deployment and subsequent expansion or revision of such undersea network systems.

In current methods used for sub-oceanic cable deployment and maintenance, all activities relating to the deployment, development, expansion or modification of electrical and/or fiber optic cables require the use of ship-board installation and maintenance facilities. This is true whether the cable is in the process of initial deployment, or when a previously deployed cable is to be repaired, re-connected, or re-directed. The joining or branching of such cables is carried out by means of splices, using any of several well known splicing techniques. However, splicing is time consuming, labor intensive, and is of a permanent, one-time only nature. This imposes a burden of added labor when such splicing has to be revised or rejoined.

In addition, once a cable has been joined, either by a separable connector or a permanent splice, and deposited on the sea floor, any revision to the junction requires retrieval of the cable from its resting place on the sea floor, to allow any necessary maintenance or alterations to be made at a ship-board maintenance facility. The retrieval of such cables after they have previously been deposited on the sea floor is a physically and technically demanding operation, making cable network modifications very expensive and time consuming. These difficulties increase when cables have been deposited into greater depths of sea water, or into sea floor environments of complex topography. Additionally, the actual expense of such operations, as well as the physical hazards related thereto, are highly vulnerable to the adversities of weather, sea currents, and other natural phenomena. The time required to complete cable retrieval, maintenance, and re-deployment is always a significant factor in the cost of sub-oceanic cable network operations. This factor becomes critical when such procedures have to be conducted for the purpose of reinstating service which has become interrupted by an inadvertent circuit failure. There has therefore long been a need for a more rapid, efficient and cost-effective method of servicing and modifying sub-oceanic cable networks.

Another problem in sub-oceanic cable installations occurs at locations where a plurality of remotely deployed cables are terminated to a single, on-shore node. Each "on-shore to off-shore" cable run must be validated by an independent government permit. Thus, each time capacity is increased, requiring a new on-shore to off-shore cable run, a new permit must be obtained.

SUMMARY OF THE INVENTION

It is an object of the present invention to provide a new and improved sub-oceanic or underwater cable system and method, as well as a new and improved junction box for use in such a system.

According to one aspect of the present invention, an underwater junction box for installation on the ocean floor to form part of a sub-oceanic cable network is provided, which comprises an outer pressure housing having a plurality of ports, at least some of the ports comprising a first part of a wet mateable underwater connector for releasable sealing connection with second part of the underwater connector provided at the end of a sub-sea cable, and a circuit routing unit in the housing connecting each first connector part in a respective port to a respective different port of housing.

Two different types of junction box may be provided, with a first junction box comprising an on-shore to off-shore junction box for use at an off-shore location installed at a predetermined distance off-shore from an on-shore cable junction node, and a second junction box comprising an off-shore junction box for routing of transoceanic cables. The first junction box has an input for connection to an end of a single on-shore to off-shore conduit having a high circuit count, as well as a plurality of ports each designed for selective connection to a single offshore cable, and the circuit routing unit connects each port to the input whereby each port is connected to respective circuits in the single onshore to off-shore conduit. The second junction box has a plurality of ports for connection to transoceanic cables and the circuit routing unit connects each port to another transoceanic cable port, whereby a desired number of incoming cables can be connected to a desired corresponding number of outgoing cables at a junction in a transoceanic cable network.

According to another aspect of the present invention, a cable system for installation on the ocean floor or under another body of water is provided, which comprises a plurality of sub-sea junction boxes installed at spaced locations throughout a predetermined sub-oceanic cable network, the junction boxes including at least some off-shore junction boxes each installed at a predetermined distance off-shore from a respective on-shore cable junction node, a main off-shore to on-shore conduit having a high circuit count extending from each off-shore junction box to the respective on-shore cable junction node, each off-shore junction box comprising an outer housing having plurality of ports for connection to a respective cable, and circuit routing within the housing connecting at least some of the ports to circuits in the off-shore to on-shore conduit.

In a typical initial installation, the circuits will comprise optical fibers or optical fibers and electrical wires. Initially, only some of the ports will be connected to cables in the sub-oceanic network, leaving some unused paths from unconnected ports through the junction box to currently unused fibers in the off-shore to on-shore conduit. This allows for subsequent expansion of the network without requiring additional permits for new off-shore to on-shore cables, as well as potential parallel or redundant circuit paths for added system reliability. The fiber routing in the housing may also connect some of the ports to other ports on the junction box, for connection of one incoming cable to another cable running offshore, rather than to the on-shore node. Additionally, the fiber routing assembly may include suitable switches for re-routing electrical wires and optical fibers between input ports and other outlets such as the off-shore to on-shore conduit or other ports on the junction box, as well as amplification and wavelength distribution devices if required.

The ports on the junction box each comprise one half of a wet mateable, plug and socket-like electro-optic or fiber optic underwater connector, with the other half of the connector being provided at the end of the cable to be connected to the port. Any suitable wet-mateable underwater connector may be used to implement this system, such as the rolling seal underwater connectors described in U.S. Pat. Nos. 5,738,535 or 6,017,227 of Cairns, the connector described in pending application Ser. No. 09/641,313 of Barlow et al., filed Aug. 18, 2000, or the connectors described in co-pending application Ser. No. 09/418,145 of Cairns, filed Oct. 14, 1999, or application Ser. No. 09/761,917 of Cairns et al., filed Jan. 17, 2001, the contents of each of which are incorporated herein by reference. Thus, these ports will be automatically sealed shut when not connected to any cable, and can be readily connected to a cable and subsequently disconnected, if desired, by a remotely operated, remote oceanic vehicle or ROV. The large fiber/electrical wire conduit running from the on-shore node to the junction box can be permanently or removably plumbed into the junction box.

This arrangement provides for quick and inexpensive off-shore circuit expansion as needed for increased system capacity, as well as the added security of redundant channels, and the ability for system upgrade without requiring additional environmental permits to run cables on-shore.

According to another aspect of the present invention, a sub-oceanic cable network installation method is provided, which comprises the steps of:

installing a plurality of junction boxes at predetermined subsea locations throughout a sub-oceanic cable network, including at least some off-shore junction boxes each located at a predetermined off-shore location at a predetermined distance from a respective on-shore cable network node, each junction box having a plurality of cable inlet/outlet ports;

running a high circuit count conduit from each on-shore cable node to the respective off-shore junction box for that node, and connecting the circuits in the conduit to a cable routing assembly in the box; and connecting at least some of the cable inlet/outlet ports to offshore cables in the network to provide a path from at least some of the connected offshore cables through the cable routing assembly to the onshore node via circuits in the conduit.

At a later date, if the network capacity is to be increased, additional offshore cables are connected to as yet unused ports on at least some of the off-shore junction boxes for connection to previously unused circuit paths in the conduit. The cable routing assembly may connect some of the junction box ports to other junction box ports, such that one offshore cable running along a coast-line, for example, may be connected to another offshore cable running from the junction box to another junction box in the network.

The system and method of this invention avoids the need to obtain additional permits to run cables on-shore each time a network capacity is increased. Instead, a single, high capacity conduit carrying much more electrical and fiber optic circuit links than a typical single underwater cable is run from an on shore node to the off-shore junction box, so that at least some of the circuit links are initially unused and can be added in as needed. The conduit may carry ten or more times the number of circuits provided in a typical underwater telecommunications cable. The system also avoids the need to make the cable connections at an on-board cable maintenance station, by using readily connectable and disconnectable underwater connectors which can be manipulated by an ROV. This also avoids the need for permanent cable splicing, and makes reconfiguration of the circuits much easier to implement.

BRIEF DESCRIPTION OF THE DRAWINGS

The present invention will be better understood from the following detailed description of an exemplary embodiment of the invention, taken in conjunction with the accompanying drawings in which like reference numerals refer to like parts and in which.

DETAILED DESCRIPTION OF THE DRAWINGS

Figure 1:
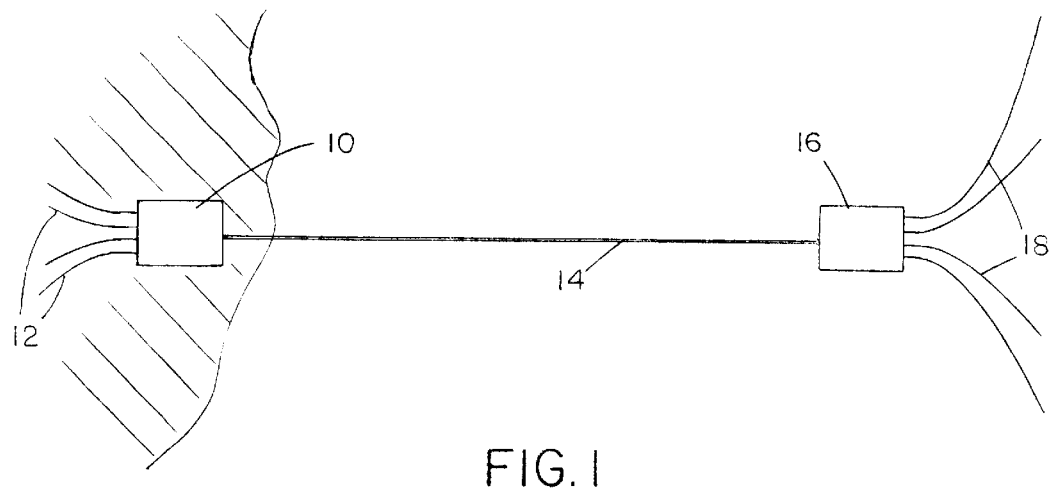
FIG. 1 is a schematic block diagram illustrating an off-shore to on-shore cable routing system according to an exemplary embodiment of the invention.
Figure 4:
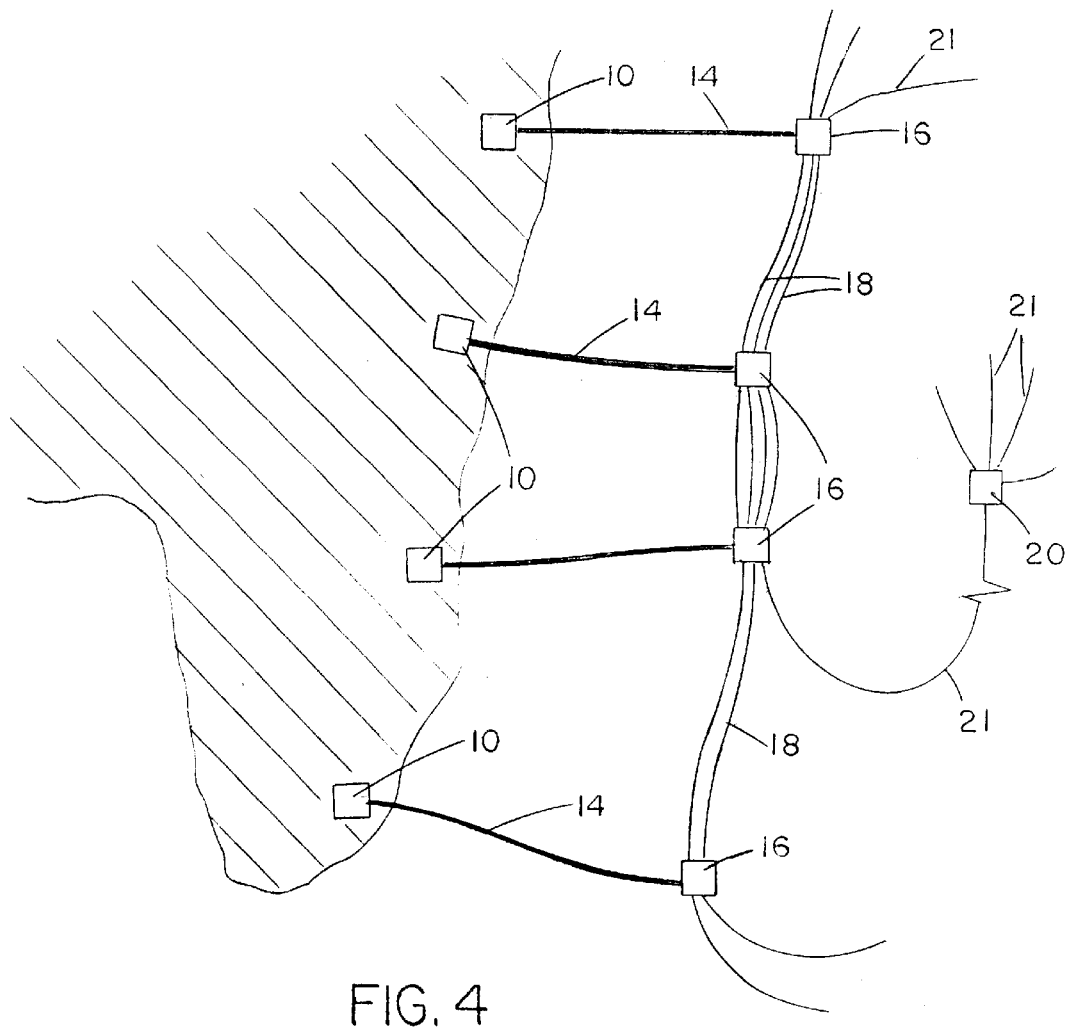
FIG. 4 is a schematic block diagram of part of a sub-oceanic cable network according to an exemplary embodiment of the invention, extending along a coastline.

FIG. 1 of the drawings schematically illustrates an off-shore to on-shore electro-optic cable connection system according to an exemplary embodiment of the invention, while FIG. 4 illustrates a larger part of an overall sub-oceanic cable network employing the system of FIG. 1 for several off-shore to on-shore cable connections. As illustrated in FIG. 1, an on-shore node 10 of a telecommunications or other communications network is connected to a number of land cables 12 in a conventional manner. A single, high density cable conduit 14 of much greater capacity than a standard sub-oceanic or underwater cable is connected at one end to the on-shore node 10, and at the opposite end to an off-shore junction box or cable junction node 16 which is located at a suitable off-shore, sea floor location in proximity to the on-shore cable node 10. A plurality of sea floor cables 18 forming part of a sub-oceanic cable network are connected to the junction box 16.

As illustrated in FIG. 4, a sub-oceanic cable network will include a plurality of off-shore junction boxes 16 at spaced locations along each coastline or shore line in the network, appropriately positioned just outside the permit zone, at positions aligned with the locations of the onshore cable nodes 10. The network may be a coastal system only, with coastal or shoreline cables 18 running along a coastline between junction boxes 16. Alternatively, the network may be trans-oceanic, including both coastal cables 18 and transoceanic cables 21, as indicated in FIG. 4. In this case, transoceanic cables 21 will also be connected to appropriate junction boxes 18 for communication with circuits in high capacity conduit 14. Additional junction boxes 20 may be located throughout the network for optimum transoceanic cable routing, in addition to the offshore junction boxes 16. Each off-shore junction box 16 is connected to the respective, closest on-shore node by a single, high capacity cable or conduit 14 requiring a single environmental permit. Some of the sub-oceanic cables 18 in the network extend from one off-shore junction box 16 to the next, while others extend further out to sea as long-haul cable runs, and are suitably connected to other junction boxes 20 in the network at appropriate locations for optimum cable routing.

Figure 2:
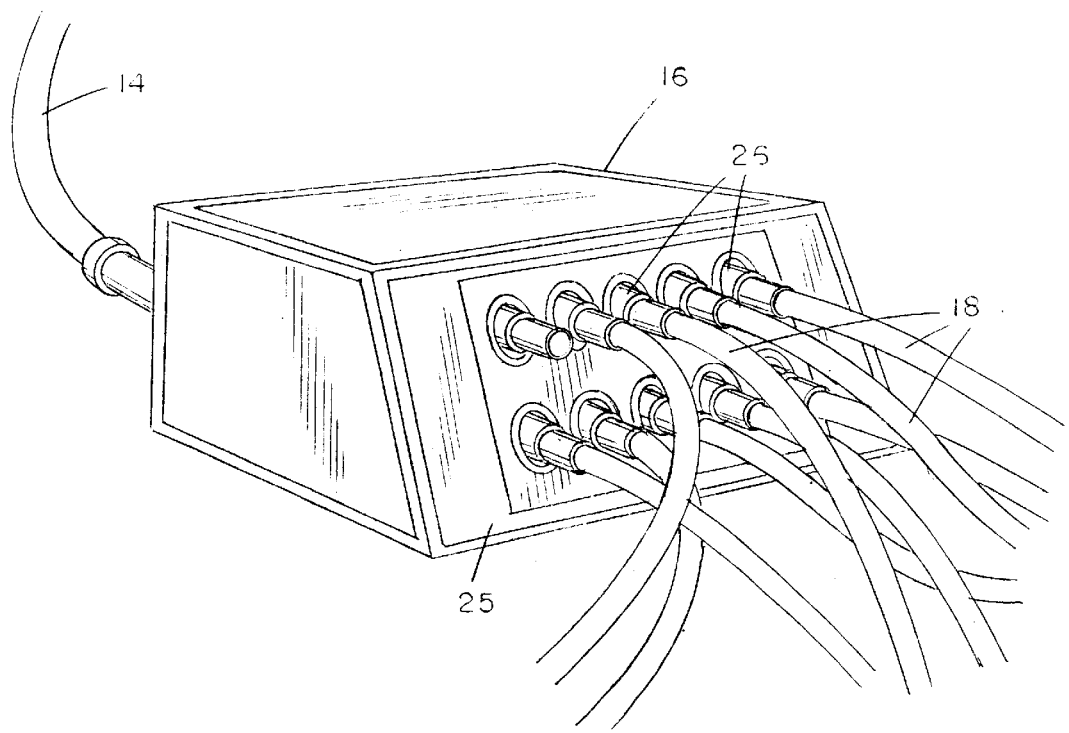
FIG. 2 is a perspective view of a junction box used in the system of FIG. 1.
Figure 3:
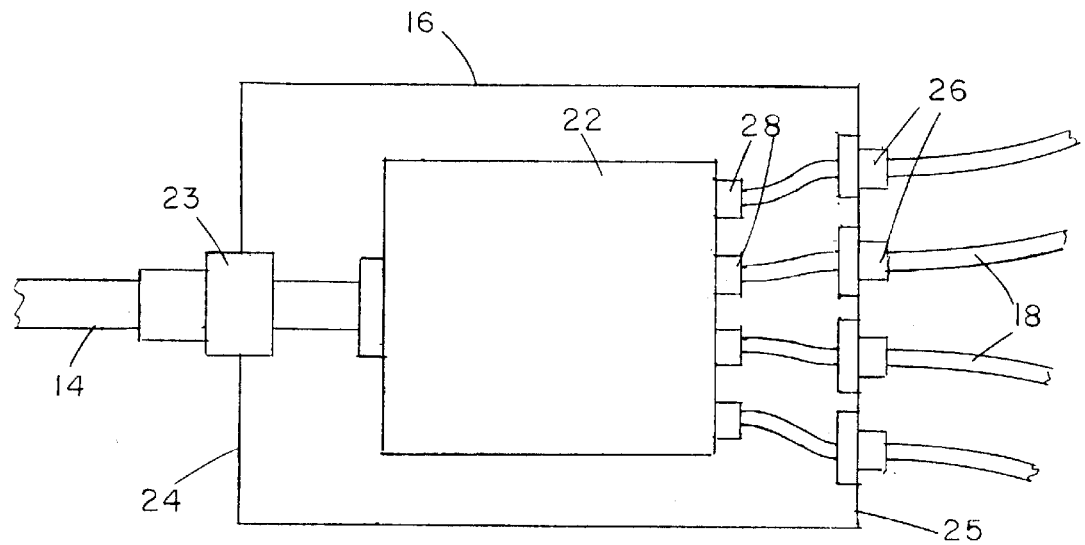
FIG. 3 is a schematic diagram illustrating the junction box routing assembly.

FIGS. 2 and 3 illustrate one of the off-shore junction boxes 16 in more detail. The junction box 16 has a high pressure rated outer housing in which a fiber or circuit routing unit 22 is located. The main cable or conduit 14 is terminated at port 23 in the junction box 16, and the optical fibers and electrical wires extending through the main cable or conduit 14 are suitably connected through one wall 24 of the junction box housing by a pressure penetrator or bulkhead feedthrough assembly of a type commercially available from Ocean Design, Inc, of Ormond Beach, Fla. The optical fibers and wires are then connected to the circuit routing unit 22. One or more of the other walls of the junction box housing, such as wall 25 as indicated in FIGS. 2 and 3, is provided with a plurality of self-sealing ports 26 for selective connection to an end of a respective cable 18 or 21. Optical fibers and electrical wires extend in cables or conduits 28 within the housing from each port 26 up to the unit 22. In the illustrated embodiment, ten self-sealing ports 26 are provided, for connection to up to ten coastline and or transoceanic cables 18,21. However, a greater or lesser number of ports 26 may be provided if required.

Each port 26 comprises one half of a wet mateable, underwater connector, with the opposite half of the connector being provided at the end of each of the cables 18, 21. Suitable connectors for this purpose are the rolling seal underwater connectors described in U.S. Pat. Nos. 5,738,535 or 6,017,227 of Cairns, the contents of which are incorporated herein by reference, the connector described in pending U.S. patent application Ser. No. 09/641,313 of Barlow et al., filed Aug. 18, 2000, now U.S. Pat. No. 6,332,787 or the squeeze-shut connectors described in co-pending application Ser. No. 09/418,145 of Cairns, filed Oct. 14, 1999, now U.S. Pat. No. 6,315,461 and Ser. No. 09/761,917 of Cairns et al., filed Jan. 17, 2001, now pending the contents of which are also incorporated herein by reference. These connectors have sealing arrangements which are arranged to open automatically as one half of the connector is mated with the other half, to allow the circuit connections to be made while still sealing the connected unit from ingress of sea water. The connector halves also seal shut automatically to prevent any ingress of water as the connector halves are unmated. The cables 18 can be readily connected to any selected port by a remotely operated underwater vehicle, or ROV, avoiding the need for cable connection or splicing on board a cable laying ship. Once the connection is made, each optical fiber and/or electrical wire in the cable 18 or 21 will be connected to a corresponding fiber or wire in the connector cable 28 within the housing.

The fiber routing unit 22 connects each fiber and/or wire in the main conduit 14 to a respective fiber/wire in a respective connector cable 28, so that all of the ports 26 are routed to respective fibers/wires in the main cable. In one example of the invention, the fiber routing unit 22 provides only direct or non-reconfigurable fiber wire routing. However, if the fiber routing through the junction box may require reconfiguration at a later date, a reconfigurable cross connect unit may be used in place of unit 22. The cross connect unit is a commercially available device, such as the photonic switching subsystem available from OMM (Optical Micro Machines) of San Diego, Calif. This will allow any of the fibers/wires in the main cable 14 to be connected to any of the fibers/wires in any of the connected cables 18 or 21. Additionally, any of the cables 18 or 21 may be connected to another cable 18 traveling along the shoreline, as indicated in FIG. 4, depending on the configuration of the cross connect unit. Power and control signals for the cross connect unit will be provided over the main cable or conduit 14 from a remote, on-shore control center. In addition to the non-reconfigurable or reconfigurable fiber routing unit, amplifiers and/or wavelength distribution devices may be provided in series between cable 14 and each of the ports 26. A suitable amplifier for this system is a 1724-type EDFA available from Agere Systems of Allentown, Pa. A suitable wavelength distribution device for use in this system is the Wavestar range of DWDM equipment of Lucent Technologies, of Murray Hill, N.J., which allows multiple wavelengths on one fiber to be separated into two or more fibers.

The junction box 16 of FIG. 2 is illustrated as having ten ports 26 for selective connection with underwater cables 18 or 21, and the main cable or conduit 14 will then have a capacity (number of wires/cables) at least ten times that of a typical underwater cable. However, a greater number of ports may be provided on the junction box if required, and the main conduit may then carry an even greater number of circuits. A typical repeatered submarine cable has 16 fibers and one high voltage (10,000 VDC) electrical conductor. Non-repeatered submarine cables, used for coastal systems, can have as many as 200 fibers per cable, with no electrical conductors. The main cable or conduit 14 illustrated in the drawings will contain up to 200 fibers to provide up to 10 landing sites, or ports, at up to 16 fibers per landing, plus spares. This is estimated to be the largest requirement for each node or junction box. The main cable 14 will also carry enough electrical conductors to support power requirements for each of the landings. This will be of the order of one power conductor and one signal conductor, or a maximum of 20 conductors per cable landing or port 26.

The main cable 14 may comprise a bundle of individual standard cables, suitably secured together, or a single cable containing all of the fibers and conductors. Alternatively, it may comprise a bored pipeline through which individual, standard cables are pulled, in quantities sufficient to support the number of landings or ports 26.

A permanently sealed interface of a standard nature may be provided between the main cable and junction box 16. Alternatively, the main cable my be releasably connected to the junction box via wet or dry mateable connectors, such as the wet mateable connector described above for the ports 26 and off-shore cables.

The additional junction boxes 20 will be of similar construction to junction boxes 16, except that they will have a larger number of connector ports 26 for providing controllable connection between a plurality of transoceanic cables 21, and will not be connected to a main, high capacity cable 14. Junction boxes 20 will be provided at various locations in the undersea cable network for optimum cable routing.

The underwater cable network installation system and method described above allows for much more efficient initial installation and subsequent expansion, maintenance and reconfiguration than existing underwater telecommunications networks. By running a series of high capacity, single main cables or conduits 14 from on-shore network nodes 10, such that only one main cable runs offshore from each on-shore node, the number of environmental permits required is considerably reduced, as is the environmental impact of the installation. On initial installation of the system, the off-shore nodes 14 will first be installed at suitable sea bed locations and a main cable will be run offshore from the closest on-shore node 10 and terminated to the respective off-shore node or junction box 14. Additional junction boxes or nodes 20 will be installed at suitable locations throughout the sub-sea network.

Cable laying ships will then deploy coastline cables 18 and remote sea-floor cables 21, each terminated with a connector half compatible with the junction box self-sealing connector ports 26. The ship will be positioned above the site of the respective junction box 14, and the cable or cables 18 will be deposited on the ocean floor in close proximity to the junction box 14. An ROV, as is well known in the art, will then be launched to the site, and any cable terminations will be quickly and efficiently mated to the appropriate termination ports 26 of the junction box or node.

At any later point in time, and with equal speed and efficiency, cables brought in from additional remote destinations can be readily joined to the system, by connecting them to any remaining, previously redundant termination ports 26. Similarly, any remote destination which has become inactive can be readily separated from the junction box, providing access for installation of cables linked to alternate destinations.

A similar technique will be used at each additional junction box or node 20, with cables 21 connected to node 20 in a similar efficient manner, providing a ready technique for branching throughout the cable network. This provides a much more efficient and effective means of cable branching than current ship-board cable splicing, and also allows for convenient reconfiguration or addition to a previously deployed network, simply by terminating new cables to any of the redundant ports of nodes 14 or 20, and/or disconnecting and re-connecting cables as desired. After design of an initial cable network with initial, sufficiently circuited trunk lines, later use of initially redundant ports can accommodate expanded junction facilities and/or installation of parallel circuit paths for increased system capacity.

A variety of in-line, system enhancement devices may optionally be installed at some or all of the junction boxes or nodes 14 or 20, inside the pressure housing, such as repeater/amplifiers, filters, encryption devices, fault detectors, and other similar enhancements.

With this method and system, in addition to improved speed and efficiency of initial installation and subsequent maintenance or network revision, such operations can also be carried out under substantially more adverse conditions of weather and sea than can current ship-board splicing and the like. In existing sub-oceanic telecommunications networks requiring re-configuration, a pre-laid, submerged cable currently has to be raised through miles of ocean depth, which can only be done under relatively calm sea conditions. In contrast, the present system avoids any need to raise previously laid cable, but simply manipulates such cables sub-sea through use of an ROV to disconnect and re-connect such cables. Therefore, this system can potentially increase the speed of repair of system outages, and carry out any installation and reconfiguration operations, with a significant reduction in the cost and inconvenience normally encountered from delays due to natural phenomena such as storms and rough sea conditions.

The in-line cable junction nodes 20 will be positioned at critical positions in the sub-oceanic cable network so as to allow for cable branching, as well as immediate or later introduction of parallel or redundant circuit paths. This will improve system performance and reliability. Through the use of sub-sea-active termination devices at the junctions of cable segments throughout a subs-sea cable network, the need for splices at cable junctions is avoided. This results in significant reduction in expense, hazard, time and inefficiency, since the joining and manipulation of the terminations at the junction boxes can be accomplished entirely by the use of ROV (remote oceanic vehicle) maintenance devices, directly on the sea floor. This completely avoids the need to carry out any cable splices or connections on board a cable laying vessel. The provision of offshore cable nodes or junction boxes together with a single, very high capacity main cable or conduit extending on shore from each offshore junction box, reduces or avoids the need to apply for additional environmental permits each time system capacity is increased.

Although an exemplary embodiment of the invention has been described above by way of example only, it will be understood by those skilled in the field that modifications may be made to the disclosed embodiment without departing from the scope of the invention, which is defined by the appended claims.

We claim:

1. A cable system for installation on the ocean floor or under another body of water, comprising:
    at least one sub-sea junction box installed at a predetermined location in a sub-oceanic cable network, the junction box being installed at a predetermined distance off-shore from a respective on-shore cable junction node;
    a main, high circuit count conduit extending from the off-shore junction box to the respective on-shore cable junction node;
    a plurality of sub-sea cables extending over the cable network, at least some of said cables comprising shoreline cables terminating at the off-shore junction box;
    the off-shore junction box comprising an outer housing having plurality of ports for releasable connection to a selected shoreline cable, and a circuit routing unit within the housing connecting at least some of the ports to circuits in the main conduit.

2. The system as claimed in claim 1, wherein at least some of the ports in the junction box are redundant ports which are initially unconnected to any cable.

3. The system as claimed in claim 1, wherein the circuit routing unit is non-reconfigurable.

4. The system as claimed in claim 1, wherein the circuit routing unit comprises a reconfigurable cross connect device, whereby circuit routing between the main conduit and connected cables can be reconfigured.

5. The system as claimed in claim 1, wherein each of the ports in the junction box comprises a first connector unit of a wet mateable underwater connector and each cable has at least one end comprising a second connector unit of a wet mateable underwater connector, the first and second connector units being releasably mateable together and each connector unit having a sealing assembly arranged to open when the units are mated and seal shut when the units are unmated.

6. The system as claimed in claim 1, including a plurality of sub-sea junction boxes installed at spaced locations throughout the cable network, at least some of the sub-sea junction boxes comprising off-shore junction boxes each installed at a predetermined distance off-shore from a respective on-shore cable junction node, and a plurality of main high circuit count conduits, each high circuit count conduit extending from a respective, different on-shore node to a respective off-shore junction box.

7. The system as claimed in claim 6, wherein the junction boxes include additional junction boxes located at spaced intervals throughout the network, the additional junction boxes each having a plurality of first and second ports for selective connection to sub-sea cables and a fiber routing unit in the box connecting each first port to a respective second port, whereby a first set of subsea cables in the network may be connected in line with a second set of subsea cables at a series of junction nodes throughout the network.

8. An underwater junction box for installation on the ocean floor to form part of a sub-oceanic cable network, comprising:
    an outer pressure housing having plurality of ports;
    a fiber routing unit inside the housing;
    at least some of the ports comprising a first part of a wet mateable underwater circuit connector for releasable sealing connection with a second part of the underwater connector provided at the end of a sub-sea cable; and the first connector part in each port being connected to circuits extending inside the housing to the fiber routing unit.

9. The junction box as claimed in claim 8, including a high circuit count, main cable connected to the housing, the circuits in the main cable being connected through the housing wall to the fiber routing unit, and the fiber routing unit connecting the circuits of each port to respective circuits in the main cable.

10. The junction box as claimed in claim 8, wherein the circuits are optical fibers.

11. The junction box as claimed in claim 8, wherein the circuits include optical fibers and electrical wires.

12. The junction box as claimed in claim 8, wherein the housing has a plurality of first ports and a plurality of second ports for selective connection to trans-oceanic subsea cables in a subsea cable network, and the fiber routing unit in the box connects each first port to a respective second port, whereby a first set of subsea cables in a network may be connected in line with a second set of subsea cables.

13. The junction box as claimed in claim 8, wherein the housing has at least 10 ports.

14. A sub-oceanic cable network installation method, comprising the steps of:
   installing a plurality of junction boxes at predetermined subsea locations throughout a sub-oceanic cable network, including at least some off-shore junction boxes each located at a predetermined off-shore location at a predetermined distance from a respective on-shore cable network node, each junction box having a plurality of cable inlet/outlet ports;
   running a single, high fiber count conduit from each on-shore cable node to the respective off-shore junction box for that node, and connecting the circuits in the conduit to a circuit routing assembly in the box; and
   connecting at least some of the cable inlet/outlet ports to offshore cables in the network while the junction box and cables are at rest on the ocean floor, so as to provide a path from at least some of the connected offshore cables through the circuit routing assembly to the on-shore node via circuits in the conduit.

15. The method as claimed in claim 14, including the step of, at a later date, connecting additional offshore cables to previously unused ports on at least some of the off-shore junction boxes for connection to previously unused circuit paths in the conduit.

16. The method as claimed in claim 14, wherein the step of connecting off-shore, subsea cables to the offshore junction boxes comprises using a remote oceanic vehicle on the ocean floor to connect each cable to a respective junction box port.

17. The method as claimed in claim 14, wherein the step of connecting said cable inlet/outlet ports to said offshore cables comprises mating a first half of a wet mateable, underwater connector mounted in each cable inlet/outlet port to a second half of said wet mateable underwater connector mounted at the end of a respective offshore cable, thereby connecting circuits in said cable to circuits in said junction box.

18. The method as claimed in claim 14, including the step of installing additional junction boxes at selected cable branching locations throughout a sub-oceanic cable network, each additional junction box having a plurality of cable inlet/outlet ports, and connecting at least some of the cable inlet/outlet ports to offshore cables in the network while the junction box and cables are at rest on the ocean floor, so as to provide a path from at least some of the connected offshore cables through the circuit routing assembly to other offshore cables connected to a respective additional junction box.

19. The method as claimed in claim 14, wherein at least some of the offshore cables connected to junction boxes are shoreline cables running along a coastline at a predetermined distance from the shore.

20. The method as claimed in claim 19, wherein some of the offshore cables connected to said junction boxes are transoceanic cables extending away from a coastline and out to sea.

21. The method as claimed in claim 19, wherein all of the offshore cables are shoreline cables.

* * * * *